(12) United States Patent  
Aoki et al.

(10) Patent No.: US 6,580,499 B2  
(45) Date of Patent: Jun. 17, 2003

(54) CHROMATIC DISPERSION DISTRIBUTION MEASUREMENT APPARATUS AND METHOD FOR THE SAME

(75) Inventors: Shoichi Aoki, Hamamatsu (JP); Akio Ichikawa, Hamamatsu (JP)

(73) Assignee: Ando Electric Co., Ltd., Tokyo (JP)

( * ) Notice: Subject to any disclaimer, the term of this patent is extended or adjusted under 35 U.S.C. 154(b) by 0 days.

(21) Appl. No.: 10/054,815

(22) Filed: Jan. 25, 2002

(65) Prior Publication Data

US 2002/0131037 A1 Sep. 19, 2002

(30) Foreign Application Priority Data

Feb. 6, 2001 (JP) ........................................ 2001-030008

(51) Int. Cl.[7] .............................................. G01N 21/00
(52) U.S. Cl. ..................................................... 356/73.1
(58) Field of Search ..................... 356/73.1; 385/12–17, 385/4, 10, 40, 130, 131, 147, 2, 37, 901; 250/227.23, 227.11, 226; 359/124, 110, 117, 161, 177, 142, 337, 337.1, 341.1, 337.2, 341.4, 341.44

(56) References Cited

U.S. PATENT DOCUMENTS

| | | | |
|---|---|---|---|
| 5,956,131 A | 9/1999 | Mamyshev et al. | |
| 6,011,615 A | * 1/2000 | Mamyshev et al. | ......... 356/634 |
| 6,424,773 B1 | * 7/2002 | Watanabe | ................... 385/122 |

FOREIGN PATENT DOCUMENTS

| | | |
|---|---|---|
| EP | 0 819 926 A2 | 1/1998 |
| JP | A 10-83006 | 3/1998 |

* cited by examiner

Primary Examiner—Tu T. Nguyen  
(74) Attorney, Agent, or Firm—Oliff & Berridge, PLC

(57) ABSTRACT

A chromatic dispersion distribution measurement apparatus, comprises: a power calculation unit for calculating a power value of an input light to be input into an optical device to be measured, in order to calculate a chromatic dispersion distribution in the optical device to be measured, in accordance with an output light power of an output light from the optical device to be measured as a function of a transmission distance along the optical device to be measured; and a control unit for controlling an input light power of the input light to the optical device to be measured in accordance with the power value of the input light which is calculated by the power calculation unit.

6 Claims, 4 Drawing Sheets

*RELATED ART*

CHROMATIC DISPERSION DISTRIBUTION MEASUREMENT APPARATUS AND METHOD FOR THE SAME

BACKGROUND OF THE INVENTION

1. Field of the Invention

The present invention relates to a chromatic dispersion distribution measurement apparatus for measuring a chromatic dispersion distribution in an optical device to be measured, such as an optical fiber, and a method for the same.

2. Description of Related Art

In recent years, in order to satisfy the demands for high speed information communications, optical communication systems using optical fibers have been constructed. One of the factors in preventing the high speed signal transmission and the long transmission distance in the above optical communication systems, is the chromatic dispersion. The chromatic dispersion is a phenomenon caused by varying the speeds of lights transmitted in a medium, with the wavelength of the light. In the construction of the optical communication systems, it is necessary to grasp the chromatic dispersion characteristic in detail.

A chromatic dispersion distribution measurement apparatus for measuring the chromatic dispersion is shown in, for example, Japanese Patent Application Publication No. Tokukai-Hei 10-83006 (corresponding to the U.S. Pat. No. 5,956,131 and the European Patent Application No. 0819926A2). In the publication, the chromatic dispersion distribution measurement apparatus measures the dispersion distribution in a longitudinal direction of a fiber to be measured, as follows. Two lights having different wavelengths from each other are inputted into the fiber to be measured. A specific wavelength component is extracted by an optical bandpass filter from a four-wave mixed light caused by the interaction between these two lights. A light having the extracted specific wavelength component is inputted into an Optical Time Domain Reflectometer (OTDR).

FIG. 3 shows the relationship between the transmission distance along the fiber (abscissa axis) and the intensity of the back-scattered light generated at any portion of the fiber to be measured (ordinate axis) when the two lights having different wavelengths from each other are launched into the fiber to be measured. This intensity distribution (shown in solid line) is observed by the OTDR. As illustrated in this figure, the intensity changes periodically according to the transmission distance. Also, the intensity decreases as the transmission distance becomes longer. Hereinafter, the intensity distribution shown in FIG. 3 is frequently called an OTDR waveform.

In such a chromatic dispersion distribution measurement apparatus, in order to obtain the chromatic dispersion distribution in the fiber to be measured, the Hilbert transform is performed on the OTDR waveform data observed by the OTDR. However, as shown in FIG. 3, since the OTDR waveform (intensity) fluctuates sharply at a near-end of an optical fiber (around a zero distance), the following problem is caused. There is an area (near-end dead zone) in which the chromatic dispersion distribution is not exactly obtained because of the limit of the Hilbert transform. That is, there is a dead zone around the zero distance where the Hilbert transform cannot be performed exactly.

SUMMARY OF THE INVENTION

In order to solve the above-described problems, an object of the present invention is to provide a chromatic dispersion distribution measurement apparatus and a method for the same, for controlling a power of an input light to be input into the optical device to be measured, for example, so as to reduce the near-end dead zone, that is, the effect of the sharpness of the intensity around the zero distance in the light intensity distribution.

That is, in accordance with the first aspect of the present invention, a chromatic dispersion distribution measurement apparatus, comprises:

an input light power calculation unit for calculating a power value of an input light to be input into an optical device to be measured, in accordance with a previously measured power of an output light from the optical device to be measured as a function of a transmission distance along the optical device to be measured;

an input light control unit for controlling an input light power of the input light to the optical device to be measured in accordance with the power value of the input light, which is calculated by the input light power calculation unit;

a scattering light power measuring unit for measuring a scattered light power of a back-scattered light scattered from each portion of the optical device to be measured, as a function of the transmission distance, when the input light of which the input light power is controlled by the input light control unit, is input into the optical device to be measured; and a chromatic dispersion distribution calculation unit for calculating a chromatic dispersion distribution value in the optical device to be measured in accordance with the scattered light power which is measured by the scattering light power measuring unit.

In accordance with the second aspect of the present invention, a chromatic dispersion distribution measurement method, comprises:

calculating a power value of an input light to be input into an optical device to be measured, in accordance with a previously measured power of an output light from the optical device to be measured as a function of a transmission distance along the optical device to be measured;

controlling an input light power of the input light to the optical device to be measured in accordance with the calculated power value of the input light;

measuring a scattered light power of a back-scattered light scattered from each portion of the optical device to be measured, as a function of the transmission distance, when the input light of which the input light power is controlled in the controlling, is input into the optical device to be measured; and calculating a chromatic dispersion distribution value in the optical device to be measured in accordance with the measured scattered light power.

According to the first and the second aspects of the present invention, by controlling the input light power of the input light to the optical device to be measured in accordance with the previously measured power of an output light from the optical device to be measured as a function of a transmission distance along the optical device to be measured, it is possible to give a correct measurement of the chromatic dispersion distribution.

The input light power calculation unit may vary the power value of the input light to the optical device to be measured, according to a level of the previously measured power of the output light from the optical device to be measured.

The input light power calculating may be carried out by varying the power value of the input light to the optical device to be measured, according to a level of the previously measured power of the output light from the optical device to be measured.

Therefore, by varying the power value of the input light to the optical device to be measured, according to a level of the previously measured power of the output light from the optical device to be measured, it is possible to increase the reliability of the measurement of the chromatic dispersion distribution.

The chromatic dispersion distribution measurement apparatus may further comprise a calculated data combination unit for combining a first chromatic dispersion distribution data which is calculated by the chromatic dispersion distribution calculation unit when the input light power is small, with a second chromatic dispersion distribution data which is calculated by the chromatic dispersion distribution calculation unit when the input light power is large.

The chromatic dispersion distribution measurement method may further comprise combining a first chromatic dispersion distribution data which is calculated when the input light power is small, with a second chromatic dispersion distribution data which is calculated when the input light power is large.

Therefore, by combining each chromatic dispersion distribution data calculated on each input light power, it is possible to increase the reliability of the measurement of the chromatic dispersion distribution further.

In accordance with the third aspect of the present invention, a chromatic dispersion distribution measurement apparatus, comprises:

a power calculation unit for calculating a power value of an input light to be input into an optical device to be measured, in order to calculate a chromatic dispersion distribution in the optical device to be measured, in accordance with an output light power of an output light from the optical device to be measured as a function of a transmission distance along the optical device to be measured; and a control unit for controlling an input light power of the input light to the optical device to be measured in accordance with the power value of the input light, which is calculated by the power calculation unit.

The power calculation unit may determine the power value of the input light to be approximately half of the output light power of the output light from a near-end portion of the optical device to be measured, when the output light power of the output light from the near-end portion of the optical device to be measured is too large to calculate the chromatic dispersion distribution.

The power calculation unit may calculate each power value of the input light in accordance with each output light power of the output lights outputted from a plurality of points of the optical device to be measured; and the control unit may control each input light power of the input light in accordance with each power value of the input light, which is calculated by the power calculation unit.

The chromatic dispersion distribution measurement apparatus may further comprise: a measuring unit for measuring each scattered light power of a light scattered from the optical device to be measured, on each input light power controlled by the control unit;

a chromatic dispersion calculation unit for calculating each chromatic dispersion distribution in the optical device to be measured, on each scattered light power measured by the measuring unit; and a combination unit for combining a part of one chromatic dispersion distribution calculated on one input light power, with a part of another chromatic dispersion distribution calculated on another input light power.

In accordance with the fourth aspect of the present invention, a chromatic dispersion distribution measurement method, comprises:

calculating a power value of an input light to be input into an optical device to be measured, in order to calculate a chromatic dispersion distribution in the optical device to be measured, in accordance with an output light power of an output light from the optical device to be measured as a function of a transmission distance along the optical device to be measured; and controlling an input light power of the input light to the optical device to be measured in accordance with the calculated power value of the input light.

The calculating may be carried out by determining the power value of the input light to be approximately half of the output light power of the output light from a near-end portion of the optical device to be measured, when the output light power of the output light from the near-end portion of the optical device to be measured is too large to calculate the chromatic dispersion distribution.

The calculating may be carried out by calculating each power value of the input light in accordance with each output light power of the output lights outputted from a plurality of points of the optical device to be measured; and the controlling may be carried out by controlling each input light power of the input light in accordance with each calculated power value of the input light.

The chromatic dispersion distribution measurement method may further comprise: measuring each scattered light power of a light scattered from the optical device to be measured, on each controlled input light power;

calculating each chromatic dispersion distribution in the optical device to be measured, on each of the measured scattered light power; and combining a part of one chromatic dispersion distribution calculated on one input light power, with a part of another chromatic dispersion distribution calculated on another input light power.

BRIEF DESCRIPTION OF THE DRAWINGS

The present invention will become more fully understood from the detailed description given hereinbelow and the accompanying drawings which are given by way of illustration only, and thus are not intended as a definition of the limits of the present invention, and wherein.

PREFERRED EMBODIMENT OF THE INVENTION

Hereinafter, an embodiment of the present invention will be explained in detail with reference to the drawings. Firstly, the structure of the embodiment will be explained.

Figure 1:
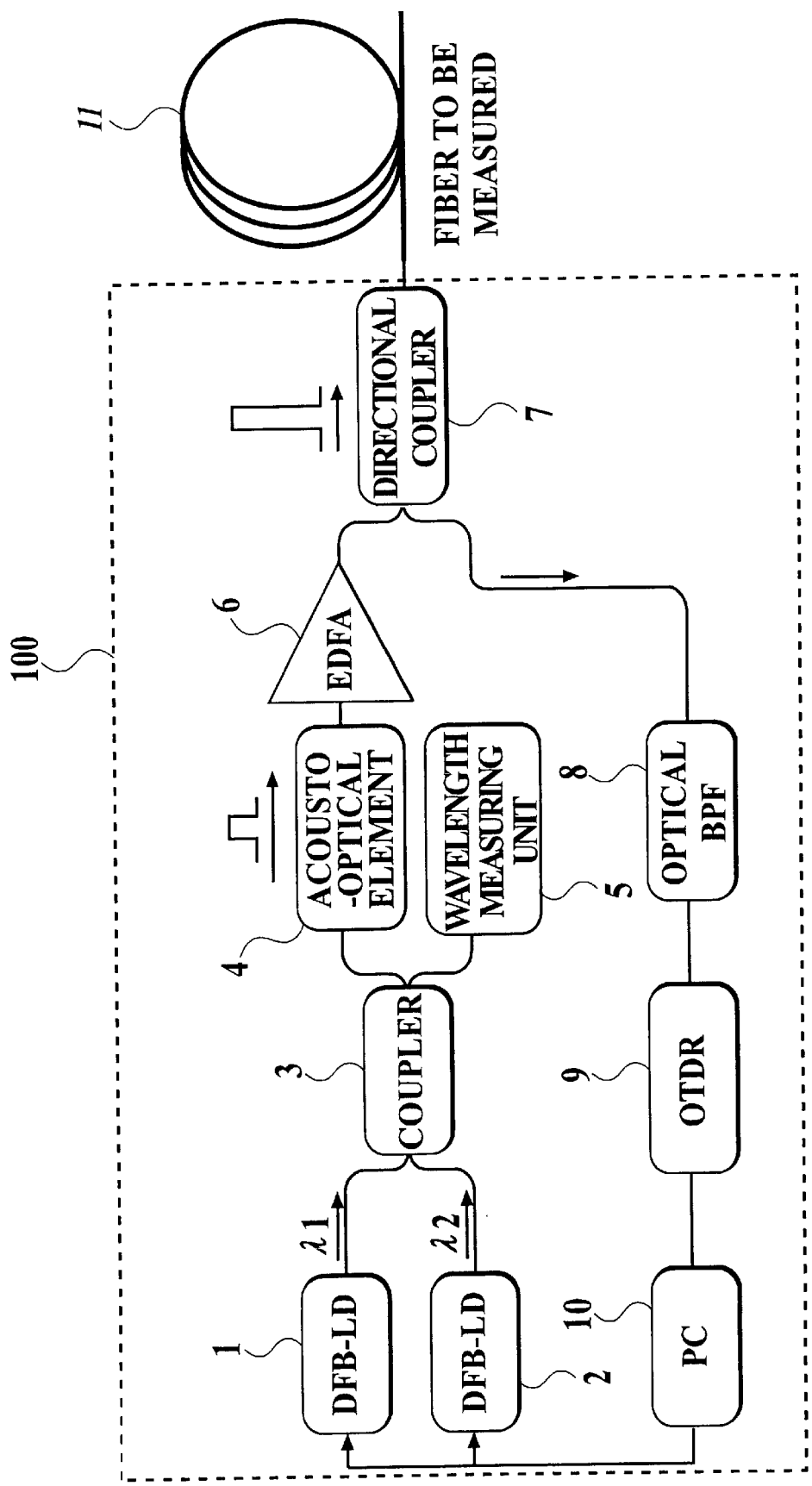
FIG. 1 is a block diagram showing a structure of an optical fiber chromatic dispersion distribution measurement apparatus to which the present invention is applied.

FIG. 1 is a block diagram showing the structure of the optical fiber chromatic dispersion distribution measurement apparatus 100 to which the present invention is applied. In FIG. 1, the optical fiber chromatic dispersion distribution measurement apparatus 100 comprises two distributed feedback-laser diodes (DFB-LD) 1 and 2, a coupler 3, an acousto-optical element 4, a wavelength measuring unit 5, an erbium-doped fiber amplifier (EDFA) 6, a directional coupler 7, an optical bandpass filter (BPF) 8, an optical time domain reflectometer (OTDR) 9, a personal computer (PC) 10 and the like. A fiber 11 to be measured is connected with the optical fiber chromatic dispersion distribution measurement apparatus 100.

The DFB-LDs 1 and 2 are light sources. The DFB-LD 1 outputs a light having a wavelength λ1. The DFB-LD 2 outputs a light having a wavelength λ2 (which is not equal to λ1). The power of these lights outputted from the DFB-LDs 1 and 2 is controlled (increased or decreased) in accordance with a control signal outputted from the PC 10 which will be explained below.

The coupler (coupler unit) 3 couples two lights outputted from the DFB-LDs 1 and 2. The acousto-optical element 4 shapes a wave form of the coupled light outputted from the coupler 3, into a pulse form. The wavelength measuring unit 5 monitors the waveform of the coupled light outputted from the coupler 3.

The EDFA 6 amplifies the pulse light outputted from the acousto-optical element 4.

The directional coupler 7 is connected with the fiber 11 to be measured. The directional coupler 7 outputs the pulse light amplified by the EDFA 6, to the fiber 11 to be measured. Further, the directional coupler 7 outputs all of the reflected lights including the four-wave mixing (FWM) light, which are generated by the fiber 11 to be measured, to the optical BPF 8.

The four-wave mixing (FWM) is a phenomenon caused by the non-linearity of a plurality of lights having different wavelengths from each other in an optical fiber. For example, when two lights have wavelengths λ1 and λ2 respectively, a wavelength λ3 of the FWM light (Stokes light) caused by this phenomenon and a wavelength λ4 of the FWM light (anti-Stokes light) caused by the phenomenon satisfy the following equation (1).

$$\lambda 2 - \lambda 1 = \lambda 1 - \lambda 4 = \lambda 3 - \lambda 2 \quad (1)$$

The optical BPF 8 passes only a light having a specific wavelength out of the FWM light outputted from the fiber 11 to be measured, and outputs the passed light to the OTDR 9. In this embodiment, the optical BPF 8 passes one of the Stokes light and the anti-Stokes light.

The OTDR 9 measures an intensity distribution of the FWM light generated in the fiber 11 to be measured, in accordance with the passed light (Stokes light or anti-Stokes light) from the optical BPF 8.

Figure 2:
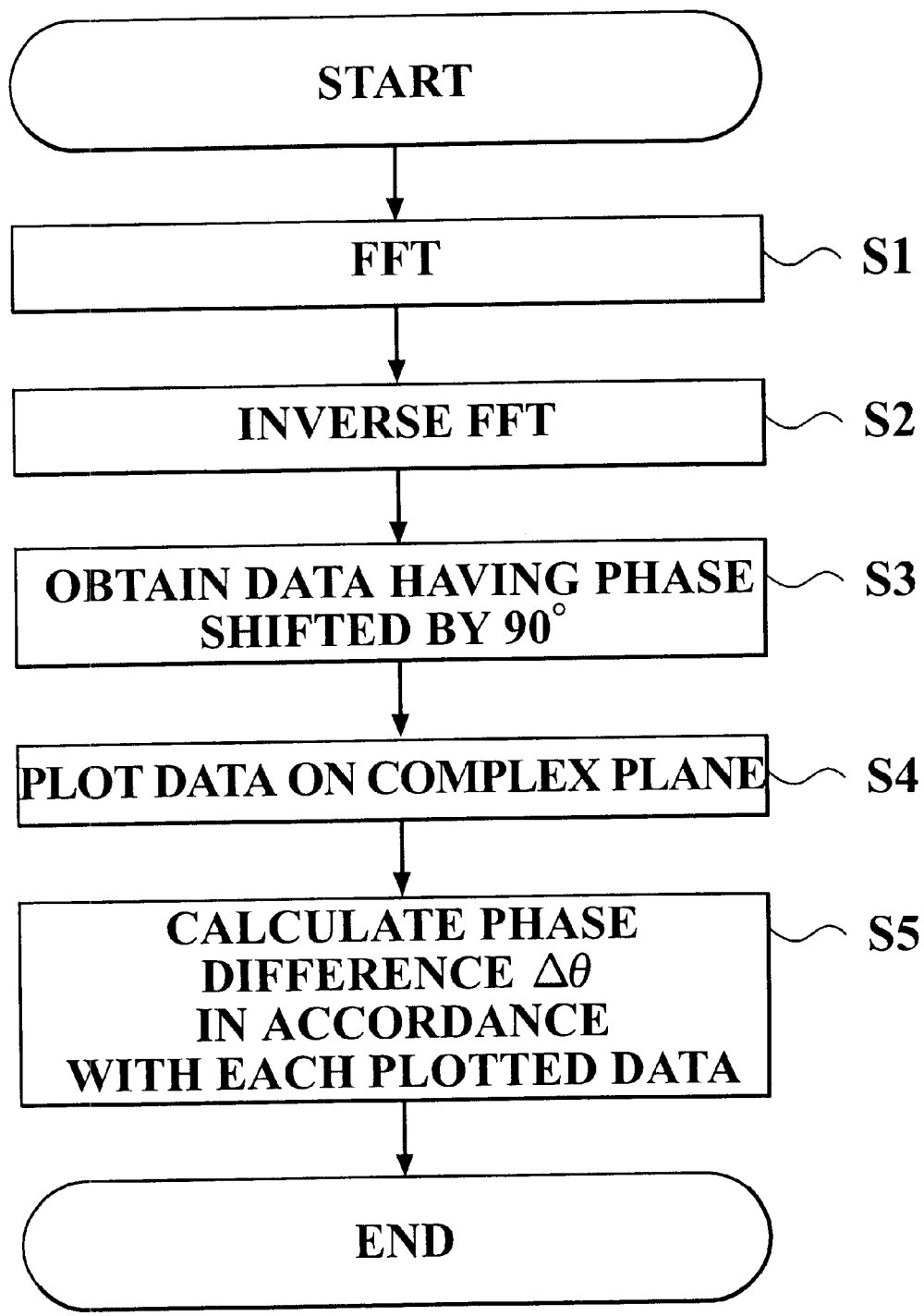
FIG. 2 shows a flow chart for explaining a chromatic dispersion calculating process for calculating a chromatic dispersion distribution in the optical fiber to be measured, which is executed by the PC.
Figure 3:
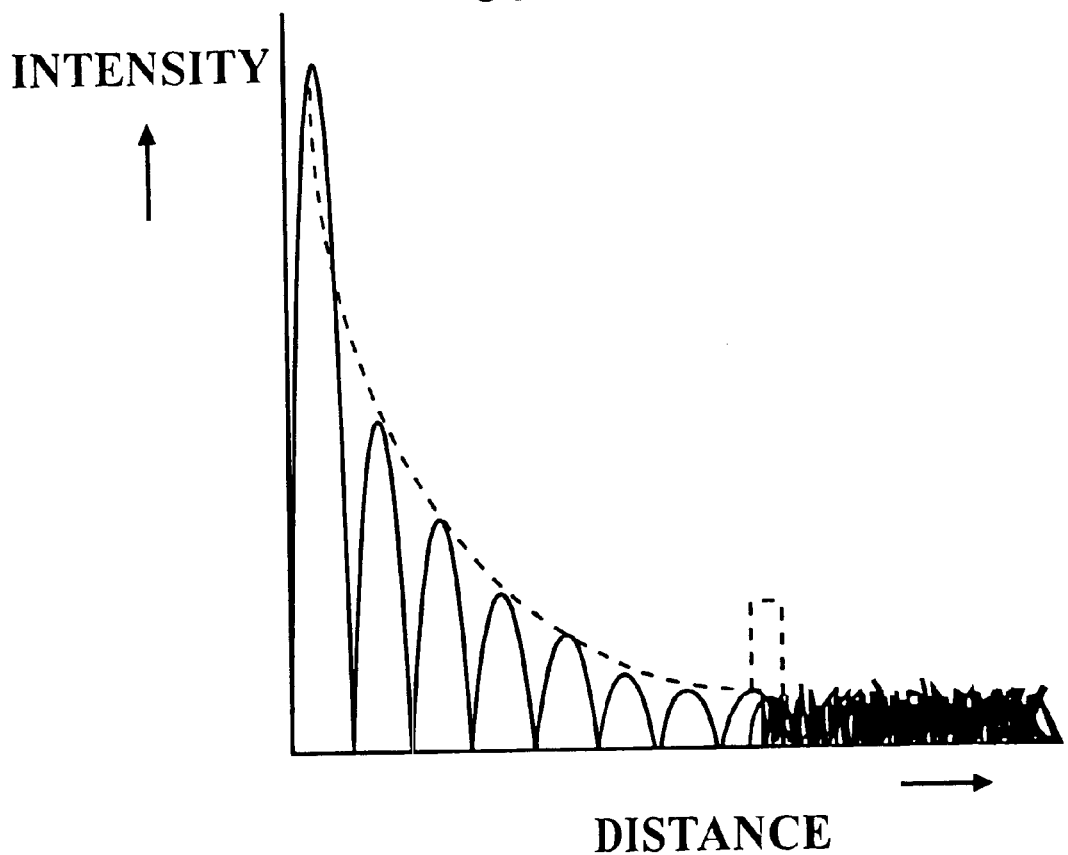
FIG. 3 shows an intensity distribution of the FWM light (a light passed through the optical BPF) as a function of the distance in the fiber to be measured.

The PC 10 calculates an optimum power of an input light to the fiber 11 to be measured, in order to calculate a chromatic dispersion distribution in the fiber 11 to be measured, based on the light intensity distribution shown in FIG. 3. Further, the PC 10 outputs power control signals to the EFB-LDs 1 and 2 in accordance with the calculated optimum power of the input light. Furthermore, the PC 10 performs a chromatic dispersion distribution calculating process (shown in FIG. 2) for the fiber 11 to be measured, on the OTDR waveform data obtained at each power of the input light. Also, the PC 10 combines each of the chromatic dispersion distributions calculated by the calculating process.

When two lights having different wavelengths from each other, which are outputted from the DFB-LDs 1 and 2, are supplied to the fiber 11 to be measured through the directional coupler 7, the fiber 11 to be measured generates an FWM light by the interaction between these two lights.

Next, the operation of the embodiment will be explained. In the beginning, the process for controlling the power of the input light, which is carried out by the PC 10 will be explained.

The intensity (power) of the back-scattered light (in this embodiment, the Stokes light) received by the OTDR 9 is $$Ps(z) = A\left(\frac{\lambda 1}{Dc\delta\lambda^2}\right)^2 \left(\frac{n_2 P_1}{A_{eff}}\right)^2 P_2 \sin^2\left(\frac{\delta kz}{2}\right) \exp(-4\alpha z) \quad (2)$$

where A is the coefficient, λ1 is the wavelength of the light outputted from the DFB-LD 1, D is the dispersion value, c is the light speed, δλ is the wavelength interval, $n_2$ is the non-linear index coefficient, $P_1$ and $P_2$ are the powers of the input lights outputted from the DFB-LDs 1 and 2, α is the fiber's loss coefficient, $A_{eff}$ is the effective area of the fiber core and z is the distance. Further, the wave-vector mismatch δk is $$\delta k = 2\pi cD\left(\frac{\delta\lambda}{\lambda 1}\right)^2 \quad (3)$$

Therefore, the intensity distribution of the light received by the OTDR 9 can be adjusted by controlling each power of the input lights outputted from the DFB-LDs 1 and 2.

First of all, the PC 10 calculates the optimum power of the input light to be supplied by the DFB-LDs 1 and 2, based on the intensity around the near-end portion of the fiber 11 to be measured, in the light intensity distribution shown in FIG. 3. To put it concretely, when the intensity around the near-end portion is so high that the intensity distribution cannot be observed by the OTDR 9, that is, when the intensity is out of the light receivable range of the OTDR 9, the optimum power of the input light is calculated, for example, to be a power corresponding to half the intensity around the near-end portion.

Next, the PC 10 controls the power of the light outputted from the DFB-LDs 1 and 2 by outputting the control signals to the DFB-LDs 1 and 2 in accordance with the calculated optimum power of the input light. Hereinafter, this optimum power is called a small power. Then, the PC 10 stores the waveform data obtained from the OTDR 9 when this small power input is applied, in a storage area (not shown in the figure) such as a Random Access Memory (RAM).

Then, the PC 10 calculates the optimum power of the input light to be supplied by the DFB-LDs 1 and 2, based on the intensity at the far-end portion in the light intensity distribution shown in FIG. 3. To put it concretely, when the light intensity at the far-end portion is so low that the intensity distribution cannot be observed by the OTDR 9, that is, when it is difficult that the variation of the intensity is observed by the OTDR 9, the optimum power of the input light is calculated, for example, to be a power corresponding to one and a half times as large as the intensity at the far-end portion.

Next, the PC 10 controls the power of the light outputted from the DFB-LDs 1 and 2 by outputting the control signals to the DFB-LDs 1 and 2 in accordance with the calculated optimum power of the input light. Hereinafter, this optimum power is called a large power. Then, the PC 10 stores the waveform data obtained from the OTDR 9 when this large power input is applied, in the storage area.

The waveform data obtained from the OTDR 9 is the intensity distribution data of the back-scattered light which is generated at any portions of the fiber 11 to be measured, as a function of the transmission distance as shown in FIG. 3. The intensity cyclically varies with the transmission distance, that is, the intensity oscillates. Therefore, the transmission distance corresponds to the phase θ(λ) in the cyclic variation (oscillation) of the intensity distribution.

Next, with reference to the flow chart shown in FIG. 2, the chromatic dispersion distribution calculating process for calculating a chromatic dispersion distribution in the fiber 11 to be measured, in accordance with the waveform data obtained from the OTDR 9, will be explained. This calculating process will be performed on each waveform data obtained in the small power input and the large power input.

First of all, the PC 10 executes the fast Fourier transform (FFT) of the OTDR waveform data (the intensity distribution data) stored in the storage area, in order to calculate the waveform data expressed by a frequency spectrum (Step S1). Next, in a plurality of waveform data expressed by the frequency spectrum, the PC 10 executes the inverse Fourier transform (inverse FFT) of only the data at positive frequencies (Step S2). Then, the PC 10 calculates the data having the phase shifted by 90° from the original OTDR waveform data (Step S3).

The PC 10 plots the waveform data obtained in the Step S3 on a complex plane (Step S4). Then, each phase difference Δθ(λ) between two adjacent plotted data is calculated (Step S5). Each chromatic dispersion value is calculated in accordance with the calculated phase difference Δθ(λ). Then, the chromatic dispersion distribution calculating process is finished.

Next, the PC 10 combines the chromatic dispersion distribution around the near-end portion, which is obtained when the small power input is applied, and the chromatic dispersion distribution at the far-end portion, which is obtained when the large power input is applied. The combined chromatic dispersion distribution is regarded as the chromatic dispersion distribution in the fiber 11 to be measured.

According to the optical fiber chromatic dispersion distribution measurement apparatus to which the present invention is applied, since the PC 10 calculates the optimum power of the input light to the fiber 11 to be measured in order to calculate a chromatic dispersion distribution in the fiber 11 to be measured, based on the previously measured power of the output light from the fiber 11 to be measured, and controls the power of the light to be emitted from the DFB-LDs 1 and 2, the effect of the sharpness of the light intensity in the OTDR waveform around the near-end portion can be reduced. As a result, the near-end dead zone can be minimized. This makes it possible to give a correct measurement of the chromatic dispersion distribution and increase the reliability of the measurement.

Although one specific embodiment of the present invention has been described, various changes and modifications may be made by those skills in the art without departing from the spirit and scope of the present invention. For example, in the process for controlling the power of the input light to the fiber 11 to be measured, it is possible to control a gain of the EDFA 6 instead of controlling the power of light to be emitted from the DFB-LDs 1 and 2 as described above.

Figure 4A:
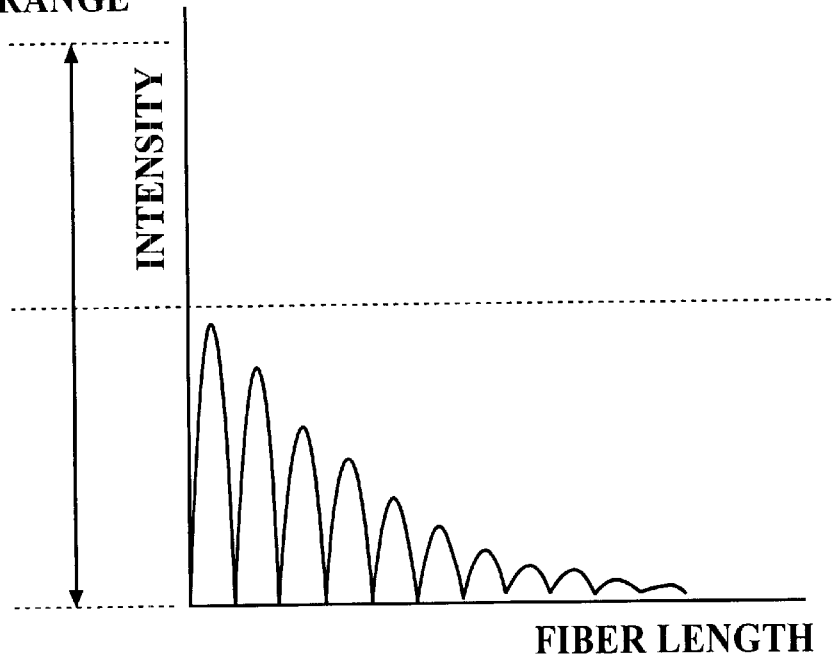
FIGS. 4A and 4B shows intensity distributions of the light received by the OTDR after each light intensity of the input lights outputted from the DFB-LDs is controlled by the EDFA.
Figure 4B:
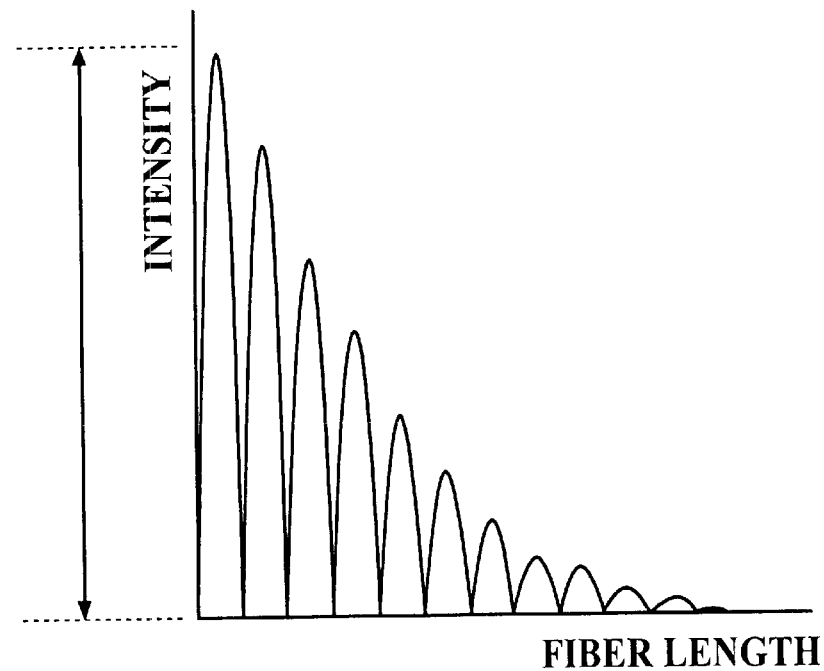

When the intensity distribution of the FWM light is observed by the OTDR 9, it is judged whether the observed intensity is out of the light receivable range of the OTDR 9. When the intensity around the near-end portion of the optical fiber is over the maximum value of the light receivable range, the EDFA 6 controls each power of the input lights so as to adjust the intensity around the near-end portion to not more than a half of the maximum value of the light receivable range as shown in FIG. 4A. After the intensity distribution is observed in the above condition, the EDFA 6 controls each power of the input light so as to adjust the intensity around the near-end portion to the vicinity of the maximum value of the light receivable range as shown in FIG. 4B. Then, the intensity distribution is observed in this condition.

In the process, it is also possible to employ a variable attenuator connected with the fiber 11 to be measured to control an attenuation of the input light.

The entire disclosure of Japanese Patent Application No. Tokugan 2001-30008 filed on Feb. 6, 2001 including specification, claims drawings and summary are incorporated herein by reference in its entirety.

What is claimed is:

1. A chromatic dispersion distribution measurement apparatus, comprising:
    an input light power calculation unit for calculating a power value of an input light to be input into an optical device to be measured, in accordance with a previously measured power of an output light from the optical device to be measured as a function of a transmission distance along the optical device to be measured, wherein the input light power calculation unit varies the power value of the input light to the optical device to be measured, according to a level of the previously measured power of the output light from the optical device to be measured;
    an input light control unit for controlling an input light power of the input light to the optical device to be measured in accordance with the power value of the input light, which is calculated by the input light power calculation unit;
    a scattering light power measuring unit for measuring a scattered light power of a back-scattered light scattered from each portion of the optical device to be measured, as a function of the transmission distance, when the input light of which the input light power is controlled by the input light control unit, is input into the optical device to be measured;
    a chromatic dispersion distribution calculation unit for calculating a chromatic dispersion distribution value in the optical device to be measured in accordance with the scattered light power which is measured by the scattering light power measuring unit; and
    a calculated data combination unit for combining a first chromatic dispersion distribution data which is calculated by the chromatic dispersion distribution calculation unit when the input light power is small, with a second chromatic dispersion distribution data which is calculated by the chromatic dispersion distribution calculation unit when the input light power is large.

2. A chromatic dispersion distribution measurement method, comprising:
    calculating a power value of an input light to be input into an optical device to be measured, in accordance with a previously measured power of an output light from the optical device to be measured as a function of a transmission distance along the optical device to be measured, wherein the input light power calculating is carried out by varying the power value of the input light to the optical device to be measured, according to a level of the previously measured power of the output light from the optical device to be measured;

controlling an input light power of the input light to the optical device to be measured in accordance with the calculated power value of the input light;

measuring a scattered light power of a back-scattered light scattered from each portion of the optical device to be measured, as a function of the transmission distance, when the input light of which the input light power is controlled in the controlling step, is input into the optical device to be measured;

calculating a chromatic dispersion distribution value in the optical device to be measured in accordance with the measured scattered light power; and combining a first chromatic dispersion distribution data which is calculated when the input light power is small, with a second chromatic dispersion distribution data which is calculated when the input light power is large.

3. A chromatic dispersion distribution measurement apparatus, comprising:

a power calculation unit for calculating a power value of an input light to be input into an optical device to be measured, in order to calculate a chromatic dispersion distribution in the optical device to be measured, in accordance with an output light power of an output light from the optical device to be measured as a function of a transmission distance along the optical device to be measured, wherein the power calculation unit calculates each power value of the input light in accordance with each output light power of the output lights outputted from a plurality of points of the optical device to be measured;

a control unit for controlling an input light power of the input light to the optical device to be measured in accordance with the power value of the input light, which is calculated by the power calculation unit, wherein the control unit controls each input light power of the input light in accordance with each power value of the input light, which is calculated by the power calculation unit;

a measuring unit for measuring each scattered light power of a light scattered from the optical device to be measured, on each input light power controlled by the control unit;

a chromatic dispersion calculation unit for calculating each chromatic dispersion distribution in the optical device to be measured, on each scattered light power measured by the measuring unit; and a combination unit for combining a part of one chromatic dispersion distribution calculated on one input light power, with a part of another chromatic dispersion distribution calculated on another input light power.

4. The chromatic dispersion distribution measurement apparatus as claimed in claim 3, wherein the power calculation unit determines the power value of the input light to be approximately half of the output light power of the output light from a near-end portion of the optical device to be measured, when the output light power of the output light from the near-end portion of the optical device to be measured is too large to calculate the chromatic dispersion distribution.

5. A chromatic dispersion distribution measurement method, comprising:

calculating a power value of an input light to be input into an optical device to be measured, in order to calculate a chromatic dispersion distribution in the optical device to be measured, in accordance with an output light power of an output light from the optical device to be measured as a function of a transmission distance along the optical device to be measured, wherein the calculating is carried out by calculating each power value of the input light in accordance with each output light power of the output lights outputted from a plurality of points of the optical device to be measured;

controlling an input light power of the input light to the optical device to be measured in accordance with the calculated power value of the input light, wherein the controlling is carried out by controlling each input light power of the input light in accordance with each calculated power value of the input light;

measuring each scattered light power of a light scattered from the optical device to be measured, on each controlled input light power;

calculating each chromatic dispersion distribution in the optical device to be measured, on each of the measured scattered light power; and combining a part of one chromatic dispersion distribution calculated on one input light power, with a part of another chromatic dispersion distribution calculated on another input light power.

6. The chromatic dispersion distribution measurement method as claimed in claim 5, wherein the calculating the power value of the input light is carried out by determining the power value of the input light to be approximately half of the output light power of the output light from a near-end portion of the optical device to be measured, when the output light power of the output light from the near-end portion of the optical device to be measured is too large to calculate the chromatic dispersion distribution.

* * * * *